Patented Nov. 7, 1922.

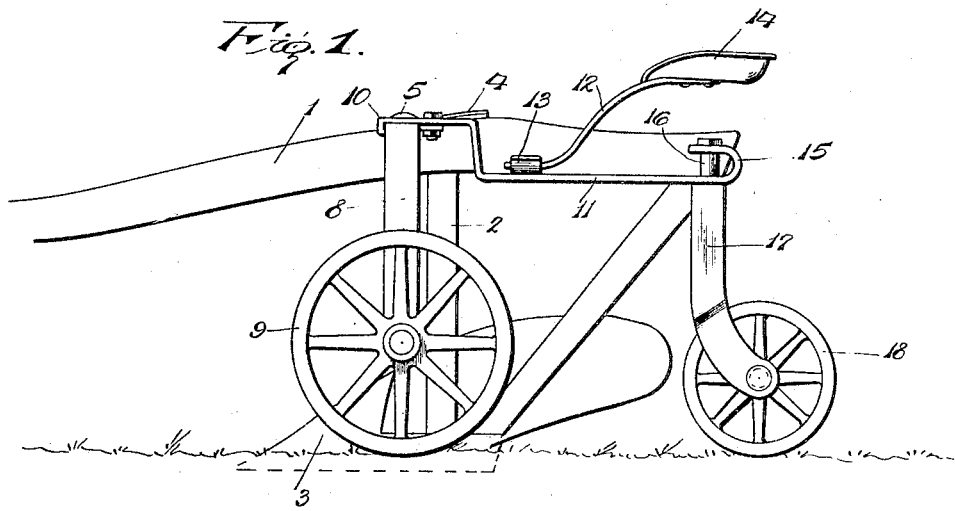
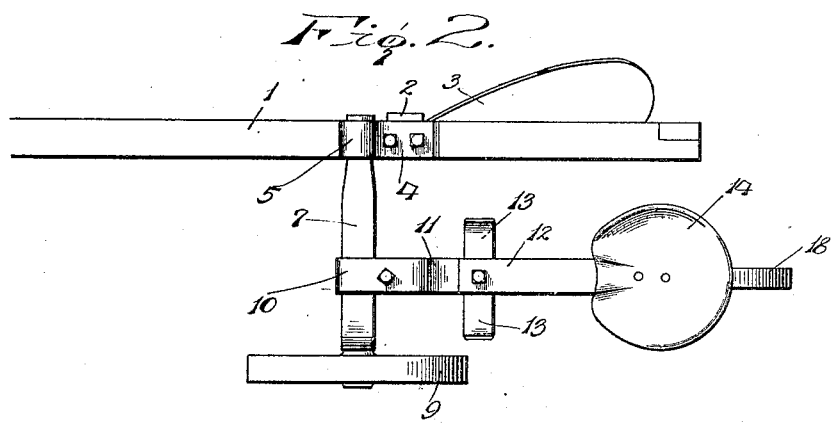
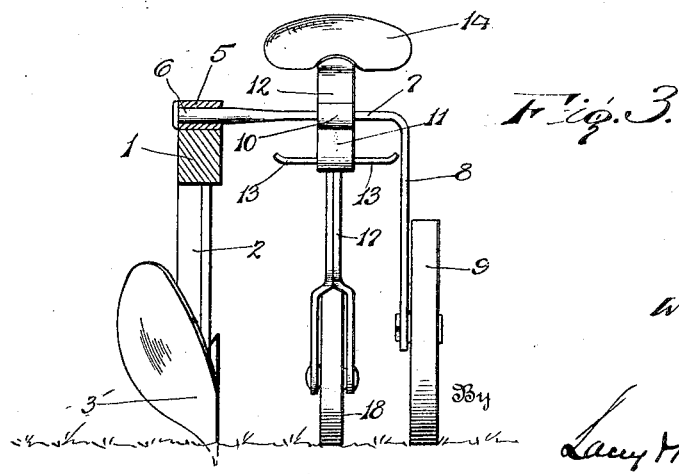

1,434,899

UNITED STATES PATENT OFFICE.

WILLIAM S. LAMKIN, OF MEMPHIS, TENNESSEE.

ATTACHMENT FOR TURNING PLOWS.

Application filed August 24, 1921. Serial No. 494,881.

*To all whom it may concern:*

Be it known that I, WILLIAM S. LAMKIN, a citizen of the United States, residing at Memphis, in the county of Shelby, and State of Tennessee, have invented certain new and useful Improvements in Attachments for Turning Plows, of which the following is a specification.

The object of this invention is to provide an attachment for turning plows whereby the driver will not be required to walk behind the plow in the furrow formed by it but may ride upon the unplowed land and guide the team more efficiently than when he is also required to hold the plow to its work. The invention seeks to provide a riding attachment for turning plows which may be readily secured in operative position upon any turning plow and by which the driver will be provided with a comfortable seat. The invention is illustrated in the accompanying drawings and will be hereinafter fully set forth.

In the drawings—

Figure 1 is a side elevation of my riding attachment connected to a plow;

Fig. 2 is a plan view of the same, and

Fig. 3 is a front elevation of the attachment with a plow beam in section.

The plow may be of any well-known construction and comprises a beam 1, a standard 2 depending from the beam, and a share 3 carried by the standard.

In carrying out my invention, I secure upon the top of the beam 1, preferably over the standard 2, a bracket 4 provided at its front end with an eye or bearing sleeve 5, and in the said eye or bearing sleeve I swivel the end 6 of a laterally extending supporting arm 7 which has its free end turned downwardly to form a standard 8 or rigidly connected with such a standard, as will be readily understood. A ground wheel 9 is mounted upon and carried by the lower end of the standard 8, as shown and as will be readily understood, so as to run upon the unplowed ground at the landside side of the plow. I also secure to the supporting arm 7, between the ends thereof, a clamp 10 which is formed upon or carried by the front end of a longitudinally extending supporting arm or bar 11, a seat standard 12 being secured upon the said beam or bar 11, and foot rests 13 being carried thereby at the lower end of said seat standard and projecting laterally from the beam, as clearly shown. A seat 14 of the usual form is carried by the upper end of the seat standard 12 and the rear end of the bar or beam 11 is doubled upon itself, as indicated at 15, to provide a substantial bearing for the pivot 16 at the upper end of a yoke 17 which carries a caster wheel 18. It will thus be seen that I have provided a very simple, inexpensive and substantial riding attachment for turning plows, by the use of which the driver will be permitted to guide the draft animals without being required to hold the plow to its work and may ride over the entire field. The weight of the riding attachment is not excessive, but it is sufficient to hold the plow to its work so that the necessity of an operator walking behind the plow in the furrow and guiding the plow is overcome. The caster wheel may turn freely through its pivotal connection with the bearing 15 so that it will readily follow the path taken by the forward wheel 9 and the swiveled connection of the extremity 6 of the supporting arm 7 with the plow beam permits the attachment to readily follow inequalities in the surface of the field so that undue jolting of the driver will be avoided.

Having thus described the invention, what is claimed as new is:

A riding attachment for turning plows comprising a lateral supporting arm adapted at one end to be connected to a plow beam, a standard depending from the opposite end of said arm, a ground wheel carried by said standard, a supporting beam secured to and extending rearwardly from said supporting arm, a yoke swiveled on the rear end of said beam, a caster carried by said yoke, a seat standard secured upon and rising from said beam, a seat carried by said standard, and foot rests secured upon the beam at the lower end of said standard and extending laterally from the beam.

In testimony whereof I affix my signature.

WILLIAM S. LAMKIN. [L. S.]